(12) United States Patent
Bader

(10) Patent No.: US 10,280,102 B1
(45) Date of Patent: *May 7, 2019

(54) METHODS TO PROPERLY CONDITION FEED WATER FOR STEAM GENERATORS IN OIL-FIELDS AND THE LIKE

(71) Applicant: Mansour S. Bader, College Station, TX (US)

(72) Inventor: Mansour S. Bader, College Station, TX (US)

( * ) Notice: Subject to any disclaimer, the term of this patent is extended or adjusted under 35 U.S.C. 154(b) by 404 days.

This patent is subject to a terminal disclaimer.

(21) Appl. No.: 13/986,762

(22) Filed: Jun. 3, 2013

(51) Int. Cl.
*C02F 9/00* (2006.01)

(52) U.S. Cl.
CPC ........................ *C02F 9/00* (2013.01)

(58) Field of Classification Search
None
See application file for complete search history.

(56) References Cited

U.S. PATENT DOCUMENTS

| | | |
|---|---|---|
| 6,365,051 B1 | 4/2002 | Bader |
| 6,663,778 B1 | 12/2003 | Bader |
| 7,093,663 B1 | 8/2006 | Bader |
| 7,501,065 B1 | 3/2009 | Bader |
| 7,789,159 B1* | 9/2010 | Bader .................... B01D 61/04 166/371 |
| 7,934,551 B1 | 5/2011 | Bader |
| 7,963,338 B1 | 6/2011 | Bader |
| 8,197,696 B1 | 6/2012 | Bader |
| 8,915,301 B1 | 12/2014 | Bader |
| 8,961,916 B1 | 2/2015 | Bader |
| 2006/0272500 A1* | 12/2006 | Keller .................... B01D 53/04 95/46 |
| 2011/0198285 A1* | 8/2011 | Wallace .................... C01B 7/03 210/638 |
| 2013/0075334 A1* | 3/2013 | Prakash .................. C02F 1/463 210/640 |

OTHER PUBLICATIONS

Macklin, S.H., Haas, W.E., Miller, W.S. Carbon Dioxide and Dissolved Oxygen Removal From Makeup Water by Gas Transfer Membranes. GE Power and Water. Jan. 2010.*

(Continued)

*Primary Examiner* — Nina Bhat

(57) ABSTRACT

A method of conditioning source water is comprised of: (a) acidifying source water by aluminum or iron chloride to prevent carboxylate from forming scale and emulsion and/or convert bicarbonate to carbon dioxide, and separating oil and/or carbon dioxide by hydrophobic membranes to produce a de-oiled and/or de-carbonated source water; (b) adding a hydrated lime or a hydrated lime with an amine solvent to separate magnesium hardness in the form of brucite and sulfate in the form calcium sulfoaluminate or calcium sulfoferrate to produce a de-brucited and de-sulfated source water; (c) if desired, reacting the excess amounts of the hydrated lime or the hydrated lime and amine solvent within the de-brucited and de-sulfated source water with carbon dioxide from step (a) to separate at least most of calcium hardness and produce a de-calcited source water; and (d) de-oxygenating the treated source water in step (b) or (c) by hydrophobic membranes.

10 Claims, 5 Drawing Sheets

(56) References Cited

OTHER PUBLICATIONS

Bader, M.; "Nanofiltration for Oil-Fields Water Injection Operations: Analysis of Concentration Polarization"; Desalination, 2006, v. 201, pp. 106-113.
Bader, M.; "Nanofiltration for Oil-Fields Water Injection Operations: Analysis of Osmotic Pressure and Scale Tendency"; Desalination, 2006, v. 201, pp. 114-120.
Bilstad, T.; "Sulfate Separation from Seawater by Nanofiltration", pp. 503-509; In Produced Water, Edited by J.P. Ray (1992).
Hardy, J.A. and Simm, I.; "Low Sulfate Seawater Mitigates Barite Scale", Oil & Gas J., Dec. 9, 1996, Iss. 50, pp. 64-67.
World Health Organization (WHO);"Desalination for Safe Water Supply, Guidance for the Health and Environmental Aspects Applicable to Desalination", Geneva 2007.
Lerch, W., et al.; "The Sulphoaluminates of Calcium", the Bureau of Standards Journal of Research, Apr. 1929, vol. 2, pp. 715-731.

\* cited by examiner

METHODS TO PROPERLY CONDITION FEED WATER FOR STEAM GENERATORS IN OIL-FIELDS AND THE LIKE

BACKGROUND OF THE INVENTION

Oil-Fields Steam Injection

Steam injection is one of the thermal heavy oil recovery methods. Steam is injected at a high pressure and a sufficient rate to heat the formation to reduce heavy oil viscosity and to drive oil toward producing wells. There are several common approaches of stream injection: (1) Steam Flood; (2) Cyclic Steam Stimulation (CSS); and (3) Steam Assisted Gravity Drainage (SAGD).

CSS and SAGD are the most widely used steam injection methods. This is attributed, in part, to their somewhat lower energy consumptions compared to steam flood as defined by the "Steam-Oil Ratio" (SOR). Table 1 presents SOR for various reservoirs. However, SOR is an initial design indicator that depends on the development strategy, and the characteristics of the reservoir and oil.

CSS typically requires lower SOR than SAGD since steam injection is intermittent rather than continuous. CSS utilizes single wells with alternating periods; a period of steam injection to fluidize heavy oil followed by a period to extract oil emulsion. On the other hand, SAGD uses pairs of horizontal wells: upper wells are used to inject steam and lower wells are used to extract oil emulsion. SAGD is therefore a continuous steam injection approach.

It's worth noting that the required amount of steam varies during actual operation. The Cumulative Steam-Oil Ratio (CSOR) over the operation life of steam injection is thus more indicative of steam consumptions. In California, for example, 2-5 barrels of water equivalent of steam injected is required to produce 1 barrel of heavy oil.

All of the steam injection approaches require nearly identical elaborate surface facilities: (1) feed water treatment plant; (2) steam generation plant; (3) gathering center for the extracted heavy oil emulsion; and (4) hot produced water separation plant and management (energy recovery, recycling, disposing, etc.). Steam injection facilities can potentially be designed for capacities that range from 5,000 to 100,000 barrels per day (BPD) of heavy oil production. However, the economic of steam injection becomes questionable at production rate over 40,000 BPD.

Each of the above mentioned plants in a steam injection surface facility represents a significant investment. The collective investment of such plants could economically make or break steam injection. As such, the design and implementation of such plants must involve complete economical optimization and integration among them by: (1) using appropriate technologies with lowest possible fuel/power consumptions particularly for steam generators and its feed water treatment; (2) maximizing heat recovery; and (3) minimizing overall waste heat loss. Without continual optimization and refinement of such integrations through all detailed engineering phases, steam injection might economically fail, particularly for high volume heavy oil production.

Steam Generators

Oil-fields are most likely located in arid, semi-arid, or remote areas where potable water is restricted or not available. Low salinity oil-fields produced water, brackish water, wastewater (domestic or industrial), agricultural drainage water, and the like provide alternative water resources for steam generators. However, such resources are typically infested with scale-prone species, traces of toxic species, and in some cases are either limited, or restricted, or not easily accessible.

The common options for oil-fields steam production are Once-Through-Steam-Generators (OTSGs) and Drum-Types Boilers (DTBs). However, OTSGs were originally developed for oil fields operation to handle poor quality water resources whereas DTBs require nearly de-ionized water quality. Table 2 compares water specifications to feed such steam generators.

The limits for OTSGs are arbitrary and based on a survey of different user practices while the limits for DTBs are based on the guidelines of the American Society of Mechanical Engineers (ASME) operating at 1000-1500 psi. Thus, the type of the steam generator dictates water's treatment level and volume.

OTSGs are preferred over DTBs in oil-fields since OTSGs are more tolerable to: (1) scale-prone species up to certain limit since its feed water has a lower concentration factor (about 75-80% steam and 20-25% concentrate) compared to DTBs (about 95% steam and 5% concentrate); (2) overheating caused by scale deposits on tubes since they have lower heat flux compared to DTBs; and (3) TDS and thus eliminate the need for the cost-prohibitive thermal de-salting methods which would significantly reduce the overall costs of steam injection. In addition, OTSGs are easier to de-scale and repair than DTBs since their tube bundles, jumper tubes, welded parts and headers can be visually inspected and maintained on the spot.

Dry natural gas is the primary fuel used in most cases to fire steam generators. It is reported that 700-1200 ft$^3$ of natural gas is required to produce one barrel of heavy oil. According to Alberta Energy & Utilities Board (EUB), the Canadian oil industry, for instance, is said to consume 1,850-1,990 ft$^3$ of natural gas to produce one barrel of bitumen (sandy oil) in 2012.

Such a level of natural gas consumption alone makes steam injection only sustainable: (1) in small production (e.g., within 20,000 BPD of heavy oil production as typically the cases); (2) if natural gas is abundantly available at low costs and oil prices are high; or (3) if a combined cycle co-generation plant (electricity-steam) is considered to reduce the overall cost (which may not be easily adoptable for remote oil fields because of its technical, economical and environmental constraints).

Further power consumptions of steam generators are also in the forms of: (1) pumping feed water at relatively high pressures (e.g., 1000-2,500 psi) to increase steam generators' efficiencies in the pre-heating stage; and (2) compressing and pre-heating significant amounts of air into burners of steam generators to improve combustion efficiency. It's worth noting that oxygen and nitrogen contents in the supplied air produce nitrogen oxides, which are air pollutants that require suitable abatement systems.

Examples of Water Sources for Steam Generators

Example 1: Oil-Fields Produced Water

For illustrative purposes, Table 3 presents two samples of low-salinity and relatively high-salinity oil-fields produced water. The oil content in such produced water varies between 100 and 1,000 mg/L. Oil content in produced water consists of three portions: (1) dispersed (floating) insoluble oil droplets on the surface of produced water; (2) dissolved non-polar hydrocarbons (species that are strictly composed of hydrogen-carbon chains and known as Total Petroleum Hydrocarbons or TPH); and (3) dissolved organic non-hydrocarbons that consist mainly of oxygen-containing species and known as carboxylic or fatty or naphthenic acids.

TPH are mostly sparingly water soluble species. However, they remain dissolved in produced water because they are below their aqueous solubility limits. The salinity of produced water tends to slightly increase such limits.

On the other hand, oxygen compounds such as carboxylic acids in heavy oil exist within their higher molecular weights, sparingly water soluble and non-volatile hydrocarbons (e.g., heavy n-paraffins, cyclo- and dicyclo-paraffins, ploynucleiaromatics etc.). Thus, the carbon structures of carboxylic acids typically correspond with the structures of their counter hydrocarbons.

Reported oil content data are mostly based on the "dispersive infrared measurements" and thus they are limited to the determination of TPH. The dispersed oil and carboxylic acids portions are typically not included in reported oil content. The determination, in particular, of carboxylic acids in produced water is of a significant importance. Reactive carboxylic acids with molecular weights between 150 and 350 exist in produced water (pH about 6.5 at the surface). Such carboxylic acids contain the carboxylate ($RCOO^-$) anions, and thus they are negatively charged. Depending on the pH of produced water, their structural identities, concentrations, and dissociation in produced water, they pair with positively charged cations such as sodium and calcium to form precipitates of sodium or calcium carboxylate.

As carbon dioxide and other acid gases are vented and/or a caustic solution is added to produced water, the pH increases. As a result, the precipitation of mixed calcium carbonate/calcium carboxylate and/or the formation carboxylate emulsion (surface active species) take place. On the other hand, if produced water is acidified but not sufficiently to control alkalinity, carbonic acid is produced. Carbonic acid is a weak acid that in turn dissociates to produce hydrogen ions and bicarbonate ions. In this case bicarbonate ions serve as a buffer which would enhance the generation of carboxylate anions. The carbonate-carboxylate critical interactions as a pH function are depicted as follows:

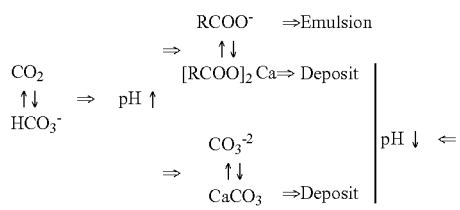

If produced water is sufficiently acidified to convert bicarbonate to free $CO_2$, but $CO_2$ is not sufficiently removed from produced water, it will convert back to bicarbonate and the formation carboxylate scale and/or emulsion will take place. However, if free $CO_2$ is rigorously removed from produced water, the formation carboxylate scale and/or emulsion can be avoided.

Partial de-oiling of produced water is conventionally targeted by two or three steps. Sludge catchers (e.g., skimmers or any other basic oil separation equipment along with coalescer) are used to primarily separate the bulk of dispersed oil droplets (>100 μm). Corrugated plate separators, hydrocyclones, centrifuges, electrostatic dehydrators, induced gas flotation without chemical addition, or a combination could then be used to remove smaller dispersed oil droplets (15-100 μm). Induced gas flotation with chemical addition or carbon adsorption (nut shell), or filtration (microfiltration or ultrafiltration), or extraction (liquids or supercritical fluids or polymers), or a combination is frequently used in a final polishing step to remove finer oil droplets (5-10 μm).

None of such conventional steps, individually or collectively, are capable of efficiently removing dissolved oily species and carboxylic acids, nor are they Zero-Liquid-Discharge (ZLD) setups (produce oily waste streams that require further treatment or disposal). Thus, a significant portion of the oil content remains in the treated produced water as a scale/emulsion contributor. An innovative ZLD de-oiling step is therefore a must to effectively recover oil content as a readily salable commodity and to prevent the formation carboxylate scale and/or emulsion.

Additionally, Table 3 reveals that 42-78% of ions in the low salinity produced water are notorious scale species (sulfate, bicarbonate, magnesium, calcium, strontium, barium, transitions metals, and silica). On the other hand, scale-prone species constitute 21% of total ions in the relatively high salinity produced water. The remaining ions in both types of produced water are mainly sodium-potassium chloride.

Table 3 indicates that the sulfate concentration is 1,207 mg/L whereas the calcium concentration is 1,101 mg/L in the low salinity produced water from. As such, the concentration of calcium sulfate dihydrate (gypsum) is 2,162 mg/L. The concentration of sodium chloride in such produced water is 3,400 mg/L. Table 3 also indicates that the gypsum concentration is 5,314 mg/L whereas sodium chloride concentration is 19,700 mg/L in the relatively high salinity produced water.

FIG. 1 reveals the saturation limits of gypsum as a function of sodium chloride concentrations. As shown in FIG. 1, gypsum concentrations in both the low salinity and relatively high salinity produced water are saturated. Thus, there is insignificant difference in preferring the low salinity over the high salinity produced water in terms of gypsum since it's saturated in both types of water.

Table 3 shows that the low salinity produced water contains an abnormally high concentration of bicarbonate (average concentration: 1,622 mg/L) but low TDS (7,870 mg/L). On the other hand, the high salinity produced water contains a normal concentration of bicarbonate (247 mg/L) but relatively high TDS (30,267 mg/L). As such, the low salinity advantage is offset by the abnormally high bicarbonate concentration. In the case of comparing de-salting methods such as Mechanical Vapor Recompression (MVR) versus high-pressure Reverse Osmosis (RO) membranes, or low-pressure versus high-pressure RO membranes, the bicarbonate factor is more significant than the TDS factor, which would favor the use of the high salinity over the low salinity produced water.

Table 3 also indicates that the total hardness (calcium and magnesium as calcium carbonate) is 4,031 mg/L in the low salinity produced water, and 8,350 mg/L in the high salinity produced water. Even though the total hardness in the high salinity produced water is twice the total hardness in the low salinity produced water, both types of water are significantly high in total hardness. In the case of using ion exchangers as the main method to soften total hardness, the low salinity produced water appears to be preferred over the high salinity produced water due to its lower TDS. However, the low salinity advantage is offset by the saturated gypsum, abnormally high bicarbonate, and existence of carboxylates (inefficient de-oiling step) that hinder the ability of ion exchangers.

Produced water also contains traces of transition metals (e.g., iron, cadmium, chromium, copper, cyanide, lead, mercury, nickel, zinc, etc.) that might substantially exceed the US-EPA National Pollutant Discharge Elimination System (NPDES). Such transition metals are typically not reported. However, if they are left to be concentrated rather than depleted by the treatment method, they represent an environmental challenge in disposing off the concentrated waste (slurry or liquid).

Furthermore, produced water may contain, to varying degrees, other problematic species such as silica, boron, hydrogen sulfide, organic contents (TOC, COD, etc.), suspended solids (TSS), and corrosion/scale inhibitors.

Example 2: Domestic Wastewater

Another possible source of feed water for steam generators is a reject stream from a domestic wastewater treatment plant. For example, FIG. 2 shows a flow diagram for an advanced wastewater treatment plant. The plant consists of four steps: (1) pre-treatment (screening, de-gritting/de-greasing, and chlorinating/de-aerating); (2) biological (sedimentation and activated sludge tanks); (3) filtration (sand and ultra filters); and (4) RO. The RO product stream is utilized for irrigation purposes whereas the reject stream is disposed off in the sea.

Table 4 presents species concentrations in the RO reject stream. The data reveals that 55% of the constituents are scale-prone species (sulfate, bicarbonate, phosphate, magnesium, calcium, strontium, barium, transition metals, and silica) and the remaining ions are basically sodium chloride. The concentrations of gypsum and sodium chloride in the RO reject stream are, respectively, 2,290 and 2,060 mg/L. FIG. 1 shows that gypsum is saturated in the RO reject stream. It should be pointed out that gypsum concentration controls the recovery ratio of RO, and thus the volume of the RO reject stream along with the concentration factor of its scale-prone species.

The RO reject stream also contains traces of transition metals (e.g., iron, cadmium, chromium, copper, cyanide, lead, mercury, nickel, zinc, etc.) that are typically not reported and might substantially exceed the NPDES. Furthermore, the RO reject stream contains noticeable concentrations of other problematic species (nitrate, organic contents, suspended solids, hydrogen sulfide, and chlorine). Such species would represent an environmental hazard in the case of disposing off further concentrated waste stream ($3^{rd}$ generation waste) if the method to treat the RO reject stream is inappropriate.

Arbitrary Water Specifications Guidelines for OTSGs

Feed water quality guidelines for OTSGs, the most common types of boilers in oil-fields steam injection, were established about fifty years ago for fair quality water resources (W. C. Burns, "Water Treatment for Once Through Steam Generators", SPE-1000, 1965). The guidelines are still in use today (Table 2) with little changes regardless of the water chemistry and the technical and economical effectiveness of treatment systems even for very poor quality water resources (as given, e.g., in Tables 3 and 4). However, the actual water chemistry rather than rigid guidelines should dictate feed water treatment systems. Proper deviations from such guidelines to handle very poor quality water resources are inevitable. The original justifications for such arbitrary guidelines, their shortcomings, and their proper modifications are discussed below.

TDS as Related to Total Hardness

In any water heating system, bicarbonate thermally breaks down to release hydroxide ion and carbon dioxide. The release of the hydroxide ion increases the pH, which in turn, triggers the precipitation of both magnesium hydroxide (brucite) and calcium carbonate (calcite). On the other hand, the release of carbon dioxide, as a non-condensable gas, causes venting problems in downstream thermal equipment.

The guidelines were mainly centered on selectively and nearly completely depleting cations scale-prone species (calcium and magnesium), known as the total hardness. Ion exchanging was and still is the prerequisite method to deplete the total hardness. However, ion exchanging as a standalone method and in different configurations is generally inefficient in removing total hardness if the TDS exceeds 8,000 mg/L unless it's coupled with other hardness removal methods (due to hardness leakage since sodium is used to exchange calcium and magnesium). In conjunction with total hardness restrictions, designers and practitioners of OSTGs thus use an arbitrary but restricted range of TDS (<8,000-12,000 mg/L).

The TDS content of OTSGs' feed water is therefore not important as long as the total hardness, or alternatively magnesium hardness (magnesium as calcium carbonate) along with sulfate and bicarbonate, are nearly completely removed from the water source. The TDS content would basically be in the form of sodium chloride, which is extremely soluble in water (about 400,000 mg/L). Thus, no sodium chloride scale deposits are expected within OTSGs.

The point being made here is that TDS ought to be limited within 10,000 mg/L only if ion exchangers are used as the main water softening method.

Total Hardness as Related to Sulfate and pH

Sulfate, similar to bicarbonate, is totally ignored in the OTSGs' feed water guidelines. However, sulfate and in most cases along with calcium are typically high in rough water resources. Their pairing hinders the efficiency of: (1) ion exchangers to deplete total hardness due to gypsum scale build-up within exchangers' resins; and (2) OTSGs due to calcium sulfate hydrates (anhydrous and hemi-hydrate) scale build-up within OTSGs' internal equipment. In addition, OTSGs' blow down streams would be infested and supersaturated with the hydrates of calcium sulfate.

An oil producer has recently requested the reduction of sulfate to less than 50 mg/L. The justification for such a request is to allow the blow down stream of OTSG to be used for oil-fields water injection operations (pressure support) without further treatment. At such low sulfate level, the existence of any concentration of calcium in feed water becomes nearly irrelevant to form calcium sulfate scale since no sufficient sulfate is available for pairing with calcium. Therefore, the total hardness requirement is replaced with magnesium hardness.

The treated feed water before it enters OTSGs ought to be kept alkaline (pH: 8.5-10) to: (1) reduce corrosion; and (2) keep silica dissolved in feed water since ion exchanging methods are ineffective in removing silica. To re-adjust the pH of treated feed water, a hydrate lime or a caustic solution (e.g., sodium hydroxide) needs to be added. However, the cost of a caustic solution is about six-times higher than the cost of hydrate lime, and thus lime is typically used to re-adjust the pH or stabilize the final product water. This is another reason to replace the total hardness requirement with magnesium hardness to maintain calcium in the treated water source for stability, and thus eliminate the need for adding a hydrate lime to reach a sufficient pH.

The point being made here is that if sulfate specification is <50 mg/L, then the total hardness should be replaced with magnesium hardness<1 mg/L. The justification is that since the solubility limit of gypsum is at least 2,200 mg/L if not higher (depending on sodium chloride concentration as shown in FIG. 1) and sulfate is below 50 mg/L, the existence of calcium is no longer an issue. In addition, the pH of the treated water must be maintained in the desired range (8.5-10).

Oxygen as Related to Sulfate and TDS

Oxygen content of feed water can be reduced by chemical scavenging or by a combination of mechanical (vacuum only) de-aeration followed by chemical scavenging. Sodium bisulfite is the most widely used oxygen scavenger. However, sodium bisulfite does not react as preferentially with the dissolved oxygen in feed water. To de-aerate feed water, approximately 6.5 mg/L of sodium bisulfite is required per 1 mg/L of oxygen. As such, depending solely on chemical de-aeration to deplete oxygen from feed water might violate the restricted concentration of sulfate (<50 mg/L) since: (1) dissolved oxygen in feed water at the surface is 6-8 mg/L, which would requires a dose of 39-52 mg/L of sodium bisulfite; and (2) sulfite ($SO_3$) in the oxygen scavenger is converted to sulfate ($SO_4$).

On the other hand, a well operated vacuum mechanical de-aerator might reduce the oxygen content to 50 µg/L. To further reduce oxygen content, a continuous dosing of sodium bisulfite (0.4-1.5 mg/L) is needed. Since conventional vacuum de-aeration combined with an oxygen scavenger may not reduce oxygen to a very low level (e.g., <7 µg/L), an innovative and effective de-oxygenation method is a must.

Sodium chloride is almost always the predominant salt in water sources. The existence of sodium chloride in any saline water increases the corrosion rate up to a concentration of 30,000 mg/L (3 wt %), and beyond such a concentration, the corrosion rate starts to decline. For this reason, "Certified Standard Corrosion Testing Methods" are conducted at 30,000 mg/L of sodium chloride, the most corrosive concentration of sodium chloride in saline water. The reason for the decline in the corrosion rate at higher concentrations of sodium chloride (beyond 30,000 mg/L) is that sodium chloride at higher concentrations depresses the solubility of oxygen (acts as a natural oxygen scavenger). That's why, for instance, high salinity formation water is depleted of oxygen with a much lower corrosion rate than produced water at the surface. As such, if feed water is nearly completely depleted of oxygen, TDS (in the form of sodium chloride) in the treated feed water becomes insignificant in causing corrosion within OTSGs.

The point being made here is that the oxygen specifications should be:

<50 µg/L if sulfate<50 mg/L and TDS<8,000-12,000 mg/L;

<7 µg/L if sulfate<50 mg/L and TDS<12,000-20,000 mg/L.

THE OBJECTIVES OF THIS PATENT

This patent provides innovative and cost effective methods to properly condition water sources to feed, for instance, steam generators by:

(1) focusing on effective de-oiling and/or de-scaling/de-gasing rather than total de-salting of water sources since OTSGs do not require complete de-salting;
(2) facilitating efficient and direct re-utilization (without further treatment) of the OTSGs' blow down stream which constitutes at least 20% of the conditioned water source (readily de-oiled and/or de-scaled) to:
  (i) recover its inherited thermal energy to pre-heat the OTSGs conditioned feed water without causing any scaling problems within heat exchangers;
  (ii) partially recycle it to supplement the OTSGs feed water, and/or
  (iii) directly reuse it for other oil-fields needs such as crude oil de-salting and washing, and/or to supplement water injection for pressure support;
(3) allowing ZLD setup since any further liquid waste generation:
  (i) might reduce the limited quantity of available water source for conditioning to meet the needed amount of steam for oil extraction, and
  (ii) might be environmentally prohibitive (disposal of a concentrate waste or slurry waste might not be an option).

SUMMARY OF THE INVENTION

In one aspect, the present invention provides a method for separating oil, carbon dioxide, magnesium, sulfate, calcium and oxygen from produced water to produce properly conditioned produced water. The inventive method comprises the steps of: (a) separating oil and carbon dioxide from produced water; (b) separating magnesium and sulfate from the de-oiled and de-carbonated produced water; (c) separating calcium from the de-brucited and de-sulfated produced water; and (d) separating oxygen and an amine solvent from the de-calcited produced water. Oil and carbon dioxide are separated from produced water in step (a) by: (i) mixing aluminum chloride or iron chloride with produced water to acidify produced water and to convert bicarbonate to free carbon dioxide and avoid the formation of carboxylate scale and carboxylate emulsion; and (ii) separating oil and carbon dioxide from produced water by first hydrophobic membranes to produce de-oiled and de-carbonated produced water. Magnesium and sulfate are separated from the de-oiled and de-carbonated produced water in step (b) by: (i) mixing a hydrate lime and an amine solvent with the de-oiled and de-carbonated produced water in a first precipitator unit to form precipitates comprising magnesium in the form of brucite and sulfate in the form of calcium sulfoaluminate or calcium sulfoferrate to produce de-brucited and de-sulfated produced water; (ii) removing precipitates from the de-brucited and de-sulfated produced water by a first vacuum filter; and (iii) recovering at least most of remaining amine solvent from the de-brucited and de-sulfated produced water by the first vacuum filter. Calcium is separated from the de-brucited and de-sulfated produced water in step (c) by: (i) reacting the excess amounts of the hydrate lime and amine solvent within the de-brucited and de-sulfated produced water from the first vacuum filter with the free carbon dioxide from step (a) in a second precipitator unit to form precipitates comprising calcium carbonate to produce de-calcited produced water; (ii) adding additional amounts of the hydrate lime and amine solvent to the de-brucited and de-sulfated produced water from the first vacuum filter to match the free carbon dioxide from step (a) in the second precipitator unit to enhance precipitates comprising calcium carbonate to produce the de-calcited produced water; (iii) removing precipitates from the de-calcited produced water by a second vacuum filter; and (iv) recovering at least most of remaining amine solvent from the de-calcited produced water by the second vacuum filter. Oxygen and amine solvent are separated from the de-calcited produced water in step (d) by second hydrophobic membranes to produce properly conditioned produced water.

Produced water is oil-fields produced water, methane-bed produced water, coal-bed produced water, or a combination thereof. The amine solvent is selected from the group consisting of isopropylamine, propylamine, dipropylamine, diisopropylamine, ethylamine, diethylamine, methylamine, dimethylamine, or a combination thereof.

In another aspect, the present invention provides a method for separating oil, carbon dioxide, magnesium, sulfate, calcium and oxygen from produced water to produce properly conditioned produced water. The inventive method comprises the steps of: (a) separating oil and carbon dioxide from produced water; (b) separating magnesium and sulfate from the de-oiled and de-carbonated produced water; (c) separating calcium from the de-brucited and de-sulfated produced water; and (d) separating oxygen from the de-calcited produced water. Oil and carbon dioxide are separated from produced water in step (a) by: (i) mixing aluminum chloride or iron chloride with produced water to acidify produced water to convert bicarbonate to free carbon dioxide and avoid the formation of carboxylate scale and carboxylate emulsion; and (ii) separating oil and carbon dioxide from produced water by first hydrophobic membranes to produce de-oiled and de-carbonated produced water. Magnesium and sulfate are separated from the de-oiled and de-carbonated produced water in step (b) by: (i) mixing a hydrate lime with the de-oiled and de-carbonated produced water in a first precipitator unit to form precipitates comprising magnesium in the form of brucite and sulfate in the form of either calcium sulfoaluminate or calcium sulfoferrate to produce de-brucited and de-sulfated produced water; and (ii) removing precipitates from the de-brucited and de-sulfated produced water by a first filter press. Calcium is separated from the de-brucited and de-sulfated produced water in step (c) by: (i) reacting the excess amounts of hydrate lime within the de-brucited and de-sulfated produced water from the first filter press with the free carbon dioxide from step (a) in a second precipitator unit to form precipitates comprising calcium carbonate to produce de-calcited produced water; (ii) adding an additional amount of the hydrate lime to the de-brucited and de-sulfated produced water from the first filter press to match the free carbon dioxide from step (a) in the second precipitator unit to enhance precipitates comprising calcium carbonate to produce the de-calcited produced water; and (iii) removing precipitates from the de-calcited produced water by a second filter press. Oxygen is separated from the de-calcited produced water in step (d) by second hydrophobic membranes to produce properly conditioned produced water.

In yet another aspect, the present invention provides a method for separating oil, carbon dioxide, magnesium, sulfate, and oxygen from produced water to produce properly conditioned produced water. The inventive method comprises the steps of: (a) separating oil and carbon dioxide from produced water; (b) separating magnesium and sulfate from the de-oiled and de-carbonated produced water; and (c) separating oxygen and recovering amine solvent from the de-brucited and de-sulfated produced water. Oil and carbon dioxide are separated from produced water in step (a) by: (i) mixing aluminum chloride or iron chloride with produced water to acidify produced water to convert bicarbonate to free carbon dioxide and avoid the formation of carboxylate scale and carboxylate emulsion; and (ii) separating oil and carbon dioxide from produced water by first hydrophobic membranes to produce de-oiled and de-carbonated produced water. Magnesium and sulfate are separated from the de-oiled and de-carbonated produced water in step (b) by: (i) mixing a hydrate lime and an amine solvent with the de-oiled and de-carbonated produced water in a precipitator unit to form precipitates comprising magnesium in the form of brucite and sulfate in the form of either calcium sulfoaluminate or calcium sulfoferrate to produce de-brucited and de-sulfated produced water; (ii) removing precipitates from the de-brucited and de-sulfated produced water by a vacuum filter; and (iii) recovering at least most of remaining amine solvent from the de-brucited and de-sulfated produced water by the vacuum filter. Oxygen and amine solvent are separated from the de-brucited and de-sulfated produced water in step (c) by second hydrophobic membranes to produce properly conditioned produced water.

In yet another aspect, the present invention provides a method for separating oil, carbon dioxide, magnesium, sulfate, and oxygen from produced water to produce properly conditioned produced water. The inventive method comprises the steps of: (a) separating oil and carbon dioxide from produced water; (b) separating magnesium and sulfate from the de-oiled and de-carbonated produced water; and (c) separating oxygen from the de-brucited and de-sulfated produced water. Oil and carbon dioxide are separated from produced water in step (a) by: (i) mixing aluminum chloride or iron chloride with produced water to acidify produced water to convert bicarbonate to free carbon dioxide and avoid the formation of carboxylate scale and carboxylate emulsion; and (ii) separating oil and carbon dioxide from produced water by first hydrophobic membranes to produce de-oiled and de-carbonated produced water. Magnesium and sulfate are separated from the de-oiled and de-carbonated produced water in step (b) by: (i) mixing a hydrate lime with the de-oiled and de-carbonated produced water in a precipitator unit to form precipitates comprising magnesium in the form of brucite and sulfate in the form of either calcium sulfoaluminate or calcium sulfoferrate to produce de-brucited and de-sulfated produced water; and (ii) removing precipitates from the de-brucited and de-sulfated produced water by a filter press. Oxygen is separated from the de-brucited and de-sulfated produced water in step (c) by second hydrophobic membranes to produce properly conditioned produced water.

In yet another aspect, the present invention provides a method for separating carbon dioxide, magnesium, sulfate, and oxygen from an aqueous stream to produce properly conditioned aqueous stream. The inventive method comprises the steps of: (a) separating carbon dioxide from the aqueous stream; (b) separating magnesium and sulfate from the de-carbonated aqueous stream water; and (c) separating oxygen and recovering amine solvent from the de-brucited and de-sulfated aqueous stream. Carbon dioxide is separated from the aqueous stream in step (a) by: (i) mixing aluminum chloride or iron chloride with the aqueous stream to acidify the aqueous stream to convert bicarbonate to free carbon dioxide; and (ii) separating carbon dioxide from the aqueous stream by first hydrophobic membranes to produce de-carbonated aqueous stream. Magnesium and sulfate are separated from the de-carbonated aqueous stream water in step (b) by: (i) mixing a hydrate lime and an amine solvent with the de-carbonated aqueous stream in a precipitator unit to form precipitates comprising magnesium in the form of brucite and sulfate in the form of either calcium sulfoaluminate or calcium sulfoferrate to produce de-brucited and de-sulfated aqueous stream; (ii) removing precipitates from the de-brucited and de-sulfated aqueous stream by a vacuum filter; and (iii) recovering at least most of remaining amine solvent from the de-brucited and de-sulfated aqueous stream by the vacuum filter. Oxygen and amine solvent are separated from the de-brucited and de-sulfated aqueous stream in step (c) by second hydrophobic membranes to produce properly conditioned aqueous stream.

Aqueous stream is domestic wastewater, reject stream from domestic wastewater treatment plant, industrial wastewater, reject stream from industrial wastewater treatment plant, agricultural drainage water, brackish water, reject stream from brackish water treatment plant, seawater, reject stream from seawater treatment plant, formation water, flue gas desulphurization water or a combination thereof.

In yet another aspect, the present invention provides a method for separating carbon dioxide, magnesium, sulfate, and oxygen from an aqueous stream to produce properly conditioned aqueous stream. The inventive method comprises the steps of: (a) separating carbon dioxide from the aqueous stream; (b) separating magnesium and sulfate from the de-carbonated aqueous stream water; and (c) separating oxygen from the de-brucited and de-sulfated aqueous stream. Carbon dioxide is separated from the aqueous stream in step (a) by: (i) mixing aluminum chloride or iron chloride with the aqueous stream to acidify the aqueous stream to convert bicarbonate to free carbon dioxide; and (ii) separating carbon dioxide from the aqueous stream by first hydrophobic membranes to produce de-carbonated aqueous stream. Magnesium and sulfate are separated from the de-carbonated aqueous stream water in step (b) by: (i) mixing a hydrate lime with the de-carbonated aqueous stream in a precipitator unit to form precipitates comprising magnesium in the form of brucite and sulfate in the form of either calcium sulfoaluminate or calcium sulfoferrate to produce de-brucited and de-sulfated aqueous stream; and (ii) removing precipitates from the de-brucited and de-sulfated aqueous stream by a filter press. Oxygen is separated from the de-brucited and de-sulfated aqueous stream in step (c) by second hydrophobic membranes to produce properly conditioned aqueous stream.

This invention is of particular interest in connection with applications such as, but not limited to, oil and gas, saline water desalination, mining, geothermal power plants, flue gas desulphurization, gypsum production, coal or oil fired power plants, industrial boilers, cooling towers, agricultural drainage water, textile, treatment of contaminated water sources such as surface or ground water by natural brine or oil-gas fields brine or brine resulting from all kinds of mining operations (sparingly soluble inorganics, toxic metals, lanthanides, actinides, etc.), treatment of natural brine or oil-gas fields brine or brine resulting from all kinds of mining operations to prevent contaminating surface or ground water, and other similar operations.

This invention is not restricted to use in connection with one particular application. This invention can be used, in general, for the effective recovery of oil and/or the selective removal of inorganic from different water sources with precipitates ranging from macro- to submicron-sizes. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

The Precipitation Concept

Figure 1:
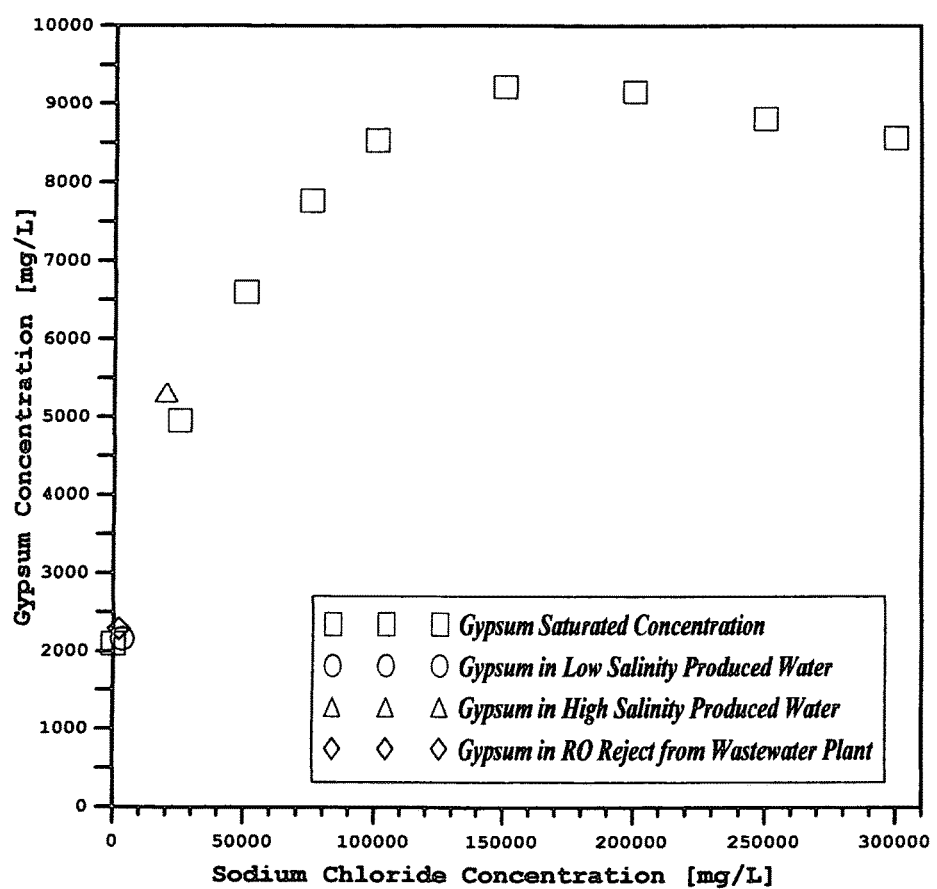
FIG. 1 illustrates the saturation limits of gypsum as a function of sodium chloride concentrations at ambient temperature.

I have previously invented the Liquid-Phase Precipitation (LPP) process for the separation of inorganic species from aqueous streams. LPP is based on mixing an aqueous stream with a suitable solvent at ambient temperature and atmospheric pressure to form selective precipitates. The suitable solvents are those which have the capability to meet two basic criteria.

The first criteria is the suitability to precipitate targeted inorganic species from aqueous solutions. The selected organic solvent must be miscible with the aqueous phase. Of equal importance, the targeted inorganic species must be sparingly soluble in the organic solvent. The addition of such a solvent to an inorganic-aqueous solution leads to the capture of part of the water molecules and reduces the solubility of inorganic species in the water which form insoluble precipitates. The solubility of the targeted inorganic species in the organic solvent is a critical factor in achieving the degree of saturation. Therefore, solubility related factors such as ionic charge, ionic radius, and the presence of a suitable anion in the aqueous solution (its effect on pH rate) play an important role in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. Further, the selected solvent must be chemically stable, compatible with the process, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different basic salts, favorable properties (boiling point: 32.4° C.; vapor pressure: 478 mmHg at 20° C.); and low environmental risks.

Improving the LPP performance is always a target. One of the essential improvements is to minimize, if not eliminate, the use of the amine solvent. Another improvement is to produce controllable precipitates that are uniformly distributed with high yield and preferably in submicron sizes.

Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macro-size precipitates will form if given sufficient time to rest.

The state (stabile, metastabe, or unstable) of given precipitates can be expressed thermodynamically by the Gibbs-Helmholtz relation as follows:

$$\Delta G = \Delta H - T \Delta S \qquad (1)$$

where $\Delta G$ is precipitates free energy (provided by, for instance, mechanical agitation or other means), $\Delta H$ is the enthalpy that represents the binding energy of the dispersed phase precipitates in the aqueous stream, T is the temperature, and $\Delta S$ is the entropy of the dispersed phase precipitates (the state of precipitates disorder). The binding energy ($\Delta H$) can be expressed in terms of the surface tension ($\tau$) and the increase in the surface area ($\Delta A$) as follows:

$$\Delta G = \tau \Delta A - T \Delta S \qquad (2)$$

When the introduced free energy into the aqueous stream exceeds the binding energy of precipitates, individual precipitates are broken down and redistributed. In addition, when a surface active agent is present in the aqueous stream as an effective dispersant, $\tau$ is reduced and thus the precipitates binding energy is diminished. Furthermore, part of the introduced energy may not contribute to precipitates deflocculating but it dissipates in the aqueous stream in the form of heat which reduces viscosity. All of these factors increase precipitates disorder (positive entropy). As such, the change in the entropy ($\Delta S$) quantitatively defines precipitates dispersion.

The Compressed-Phase Precipitation (CPP) process is thus developed to achieve sub-micron precipitates in certain applications. CPP is conceptually similar to LPP in which the targeted inorganic species must be nearly insoluble in the amine solvent whereas the mother solvent (water) is miscible with the amine solvent. However, the difference is that fluids in the CPP process can be subjected to pressure and/or temperature manipulations, or fluids modifications to force unusual thermo-physical properties (e.g., exhibit liquid-like density but with higher diffusivity, higher compressibility and lower viscosity).

The fast diffusion combined with low viscosity of the compressed amine solvent into the aqueous phase produces faster supersaturation of targeted ions, and their possible precipitation in the desired and sub-micron and micron sizes. Thus, the precipitate-size as well as the precipitate-size distribution, morphology, and crystal structure can be controlled. Achieving faster supersaturation would, in turn, minimize the use of the amine solvent, reduce the size of precipitation vessels, and allow the recovery of targeted ions in the desired precipitates shape and distribution. However, several factors could influence the performance of the precipitation process. Among such factors are the identity and initial concentrations of targeted ions in an aqueous stream.

Targeted Ions in Water Sources Such as Oil-Fields Produced Water and RO Reject Stream This invention departs from conventional water conditioning methods by providing novel methods to effectively de-oil, de-carbonate, de-brucite, de-sulfate, de-calcite, and de-oxygenate water sources to feed OTSGs.

A water source can be first innovatively acidified with either aluminum chloride or iron chloride. The addition of either aluminum chloride or iron chloride serves three vital processing steps: (1) preventing the formation carboxylate scale and/or emulsion (in the case of using for example oil-fields produced water as a water source); (2) converting bicarbonate ions to free $CO_2$; and (3) providing trivalent cations (aluminum or iron) to enhance the de-sulfation of the water source in a later step of the inventive methods. Once the water source is sufficiently acidified, the de-oiling and de-carbonation take place.

My innovative and effective de-oiling step is analogous to the natural demulsification phenomenon of crude oil. The natural demulsification of oil-brine liquid phases starts in downhole in oil reservoirs where oil preferentially squeezes through the narrow pores of organically surface coated rocks (oil wet sandstone or limestone or dolomite) and trapped by impermeable rocks (clay or shale). In such a natural downhole capillary flow, no shear or differential velocity (velocity is in the direction of the flow) or oil droplets rotation are induced. Thus, capillary flow is the most efficient method to separate oil content from water.

The de-oiling step takes advantages of the immiscibility of oil content in water by properly configurating hydrophobic membranes to repel water (the non-wetting liquid) and allow oil content (the membrane wetting species) to permeate through the membranes by applying a very low pressure. However, such water repellent membranes do not permit passage of water through the membrane until the water capillary pressure ($p_c$) of the membrane is exceeded. $p_c$ depends on the interfacial tension, contact angle, and the pore size distribution of the membrane. The de-oiling step can also serve as a de-carbonation to effectively remove free $CO_2$ from the water source.

The precipitation of magnesium and sulfate can be achieved in one step by adding a hydrate lime to the de-oiled/de-carbonated water source to precipitate magnesium in the form of brucite, and sulfate in the form of calcium sulfoaluminate (as the case of adding aluminum chloride as an acidifying agent) or calcium sulfoferrate (as the case of adding iron chloride as an acidifying agent). A selected amine solvent can also be added to enhance the precipitation of magnesium and sulfate. It is worth noting that along with the precipitation of magnesium and sulfate, the precipitation of transition metals and silica will also take place.

The de-brucited and de-sulfated water source that still contains an excess amount of (un-reacted) hydrate lime can then be reacted with the free $CO_2$ from the de-carbonation step to precipitate calcite as follows:

$$CO_2 + Ca(OH)_2 \rightarrow CaCO_3 + H_2O \qquad (3)$$

Depending on the amount of the free $CO_2$, additional amounts of a hydrate lime and/or an amine solvent might also be added to aid in completing the precipitation of calcite.

A final step of hydrophobic membranes can be used for stripping off the amine solvent and oxygen to complete the proper conditioning of the water source.

It is worth noting nothing that there are other possible alternatives to conduct the precipitation of inorganic salts. One of the possible alternatives is that the first precipitation step allows magnesium to precipitate in the form of brucite using only an amine solvent as a precipitation agent, and react it simultaneously with the free $CO_2$ from the de-carbonation step to produce magnesium carbonate as follows:

$$CO_2 + Mg(OH)_2 \rightarrow MgCO_3 + H_2O \qquad (4)$$

In the second precipitation step, the precipitation of sulfate takes place by adding a hydrate lime to form precipitates comprising either calcium sulfoaluminate (acidifying agent: aluminum chloride) or calcium sulfoferrate (acidifying agent: iron chloride).

Another possible alternative is that the first precipitation step allows magnesium to precipitate in the form brucite by adding a hydrate lime (with or without adding an amine solvent), and react it simultaneously with the free $CO_2$ from the de-carbonation step to produce magnesium-calcium carbonate (dolomite) as follows:

$$2CO_2 + Ca(OH)_2 + Mg(OH)_2 \rightarrow CaMg(CO_3)_2 + 2H_2O \qquad (5)$$

In the second precipitation step, the precipitation of sulfate takes place by adding a further amount of a hydrate lime and/or an amine solvent to form calcium sulfoaluminate (acidifying agent: aluminum chloride) or calcium sulfoferrate (acidifying agent: iron chloride).

Proper Conditioning of Water Sources for OTSGs

Figure 3:
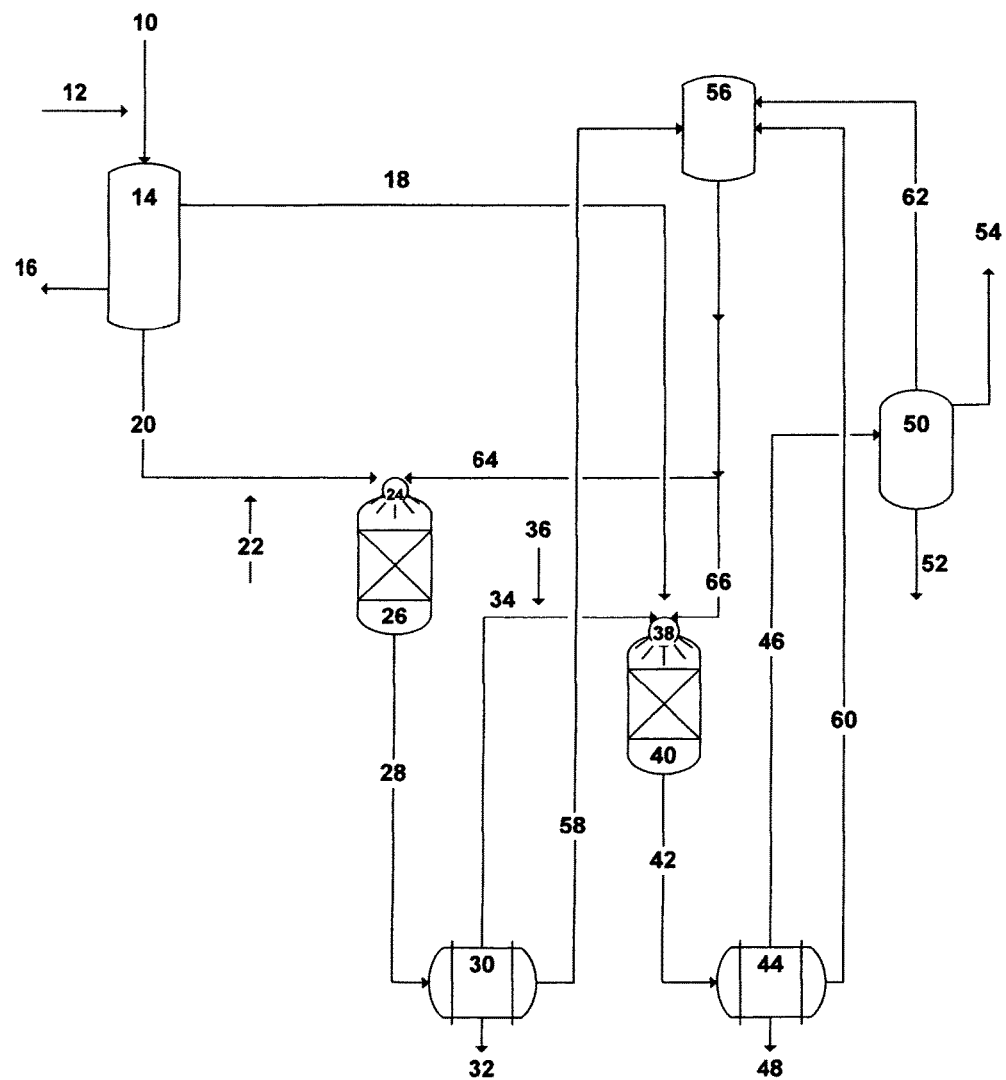
FIG. 3 illustrates a possible flow diagram for the invented method to de-oil, de-carbonate, de-brucite, de-sulfate, de-calcite, and de-oxygenate water sources.

Reference is now made to FIG. 3 that depicts a simplified possible flow diagram illustrating the inventive method to properly condition water sources. Produced water is used as a water source to illustrate the inventive method.

De-gritted produced water [10] for example by a stage of hydrocyclones or centrifuges (not shown) will be mixed with either aluminum chloride or iron chloride [12] to reduce the pH to about 4 to convert bicarbonate ions to free $CO_2$. The de-gritted and acidified produced water will be fed to the de-oiling step [14] to recover oil as a salable commodity [16] as well as to de-carbonate produced water [18].

The de-oiling/de-carbonation step [14] can also be conducted in a dual stage of hydrophobic membranes in which the first stage targets the removal of the oil bulk [16] whereas the second stage targets the removal of the free $CO_2$ bulk [18].

The de-oiled/de-carbonated produced water [20] will be mixed with a sufficient amount of a hydrate lime [22] and introduced into the first precipitator unit [26] preferably via the inner tube of at least one concentric nozzle [24]. A selected amine solvent [64] might simultaneously be introduced into the same precipitator unit [26] preferably through the coaxial annulus of the same concentric nozzle [24]. The purpose of the first precipitator unit [26] is to efficiently precipitate brucite along with calcium sulfoaluminate (in the case of using aluminum chloride as an acidifying agent) or calcium sulfoferrate (in the case of using iron chloride as an acidifying agent) from produced water to produce de-brucited and de-sulfated produced water.

The outlet stream [28] from the first precipitator unit [26] will be fed into the first filtration stage [30] to separate the formed precipitates from produced water. In the case of using an amine solvent [64], filtration can be accomplished by a stage of vacuum filters [30]. The dewatered precipitates [32] will be recovered as a commodity and transferred to a suitable usage site. The recovered amine solvent [58] from the stage of vacuum filters [30] will be recycled to the amine storage tank [56].

The decanted stream [34] from the first stage of vacuum filters [30] that is depleted of brucite and sulfate but contains an excess amount of un-reacted hydrate lime will be introduced into the second precipitator unit [40] preferably via the inner tube of at least one concentric nozzle [38]. The free $CO_2$ [18] from the de-oiling/de-carbonation stage [14] will be simultaneously injected into the second precipitator unit [40] preferably through the coaxial annulus of the same concentric nozzle [38] to precipitate calcite. Depending on the amount of the free $CO_2$ [18], additional amounts of a hydrate lime [36] and/or a selected amine solvent [66] might also be added into the second precipitator unit [40] to complete calcite precipitation.

The outlet stream [42] from the second precipitator unit [40] will be fed into the second stage of vacuum filters [44] to separate calcite precipitates from produced water. The dewatered precipitates [48] will be recovered as a commodity and transferred to a suitable usage site whereas the recovered amine solvent [60] will be recycled to the amine storage tank [56].

The decanted stream [46] of the second stage of vacuum filters [44] that contains the amine solvent and produced water (rich with sodium-potassium chloride, sylvinite) will be fed into the final stage of hydrophobic membranes [50] to strip off the amine solvent [62] and de-oxygenate [54] produced water. The recovered amine solvent [62] will be recycled to the amine storage tank [56]. The properly conditioned produced water [52] can be used to feed, for instance, OTSGs.

It should be understood that multiple precipitator units in each of precipitation steps of the inventive methods can be used as needed.

It should also be understood that multiple concentric nozzles in each of precipitator units of the inventive methods can be used as needed.

It should also be understood that the amine solvent, hydrate lime, and produced water can be mixed using multiple and separate nozzles.

It should also be understood that the amine solvent, hydrate lime, and produced water can be co-introduced via a mixing twin-fluid nozzle or multiple mixing twin-fluid nozzles before entering precipitator units.

It should also be understood that the second precipitation step is aimed at calcite precipitation when the bicarbonate concentration in produced water is abnormally high, as is the case with the low salinity produced water (see Table 3). Thus, the use of free $CO_2$ to precipitate calcite is beneficial in utilizing the excess amount of hydrate lime from the first precipitation step and in protecting the environment from emitting $CO_2$. It should be pointed out that the estimated free $CO_2$ from the de-carbonation step [14] for treating 300,000 barrels/day of the low salinity produced water is about 2,840 metric tons.

Figure 4:
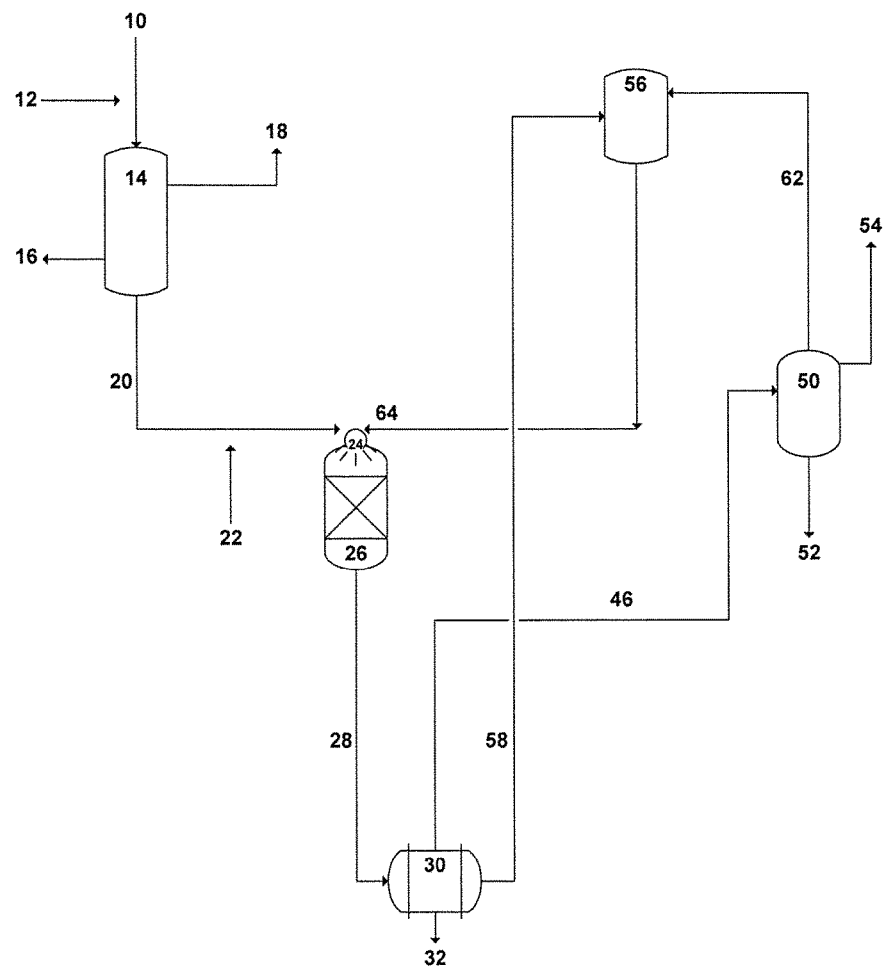
FIG. 4 illustrates a possible flow diagram for the invented method to de-oil, de-carbonate, de-brucite, de-sulfate, and de-oxygenate water sources.

It should also be understood that the calcite precipitation step can be truncated as shown in FIG. 4 if the substantial amount of the free $CO_2$ [18] from the de-oiling/de-carbonation step [14] of the low salinity produced water (Table 3) is re-utilized as a supercritical fluid for heavy oil recovery instead of steam injection.

It should also be understood that the calcite precipitation step can be truncated as shown in FIG. 4 if the free $CO_2$ [18] from the de-oiling/de-carbonation step [14] is possibly vented when the bicarbonate concentration in the water source is normal (e.g., the relatively high salinity produced water and the RO reject stream from the advanced Wastewater Treatment Plant).

It should also be understood that in the case of truncating the calcite precipitation step as shown in FIG. 4, the remaining excess amount of the hydrate lime from the first precipitation step is needed to stabilize the treated water source by maintaining alkaline pH (8.5-10).

It should also be understood that de-oiling/de-carbonation step [14] as shown in FIGS. 3 and 4 will serve as a de-carbonation step only if the water source is not oily as is the case with the RO reject stream from the advanced Wastewater Treatment Plant (Table 4).

It should also be understood that the use of a selected amine solvent might be eliminated. The processing steps [56-66] as given in FIG. 3 and the processing steps [56, 58, 62 and 64] as given in FIG. 4 will be truncated. Filter presses will replace vacuum filters. The second stage of hydrophobic membranes (processing step 50 as given in FIG. 3 and processing step 50 as given in FIG. 4) will be used for only de-oxygenation.

Figure 2:
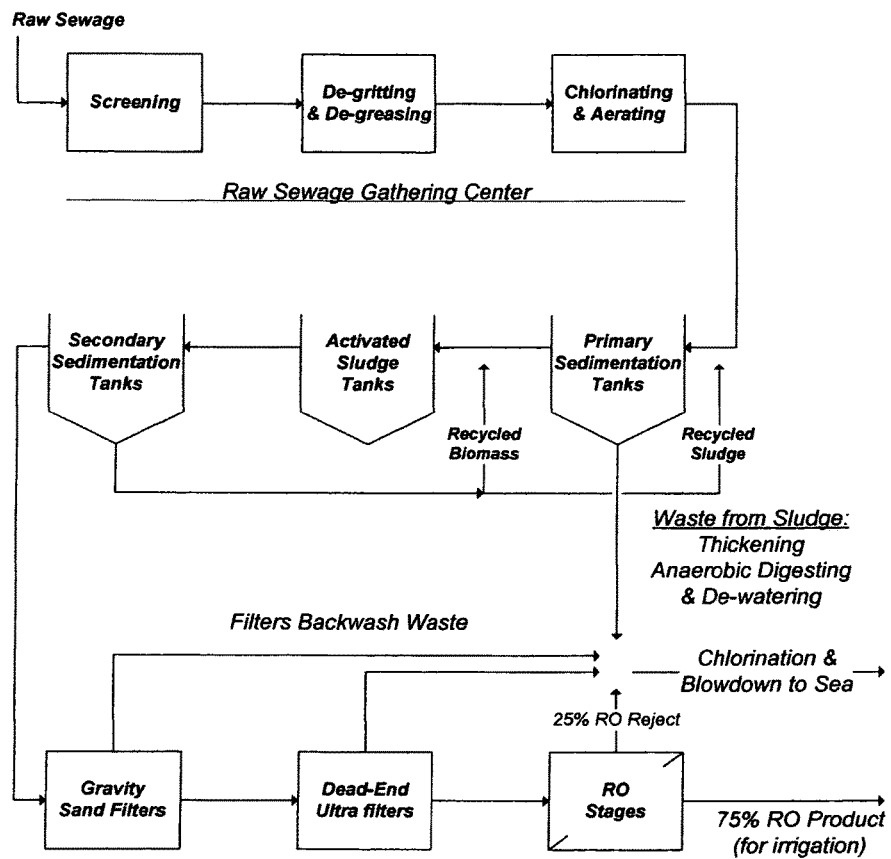
FIG. 2 illustrates a possible flow diagram for an advanced Wastewater Treatment Plant.
Figure 5:
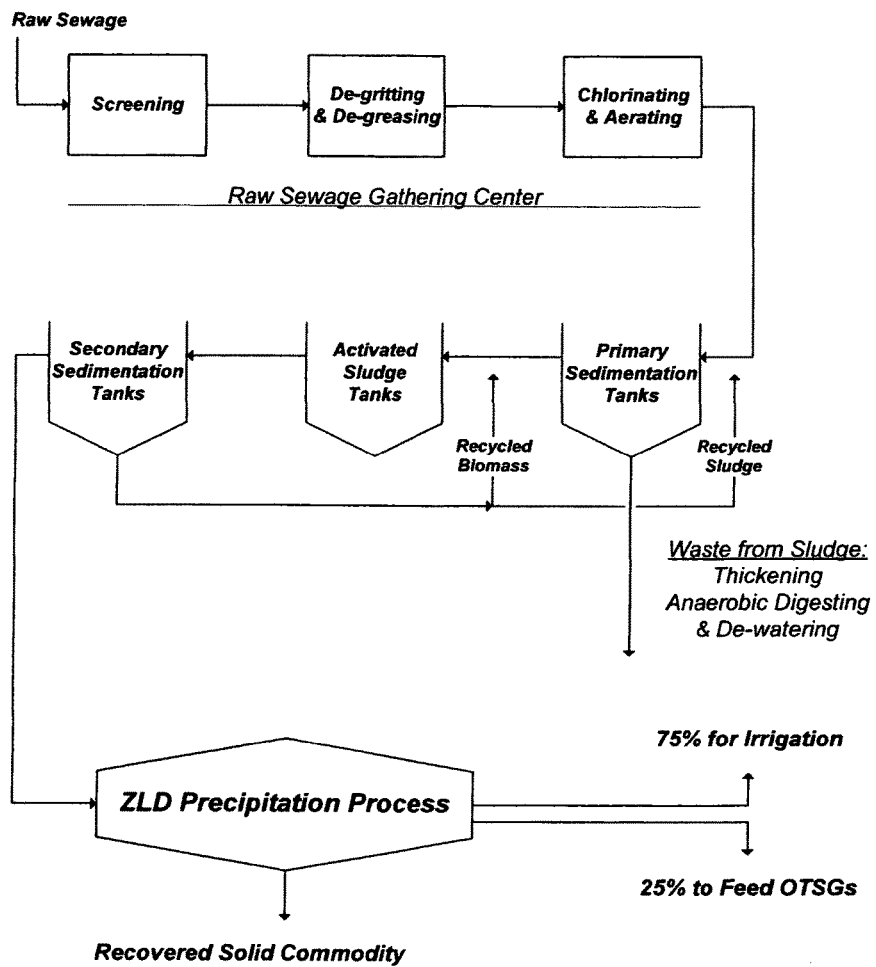
FIG. 5 illustrates the possible integration of the invented methods with the advanced Wastewater Treatment Plant as an effective technical, economical and environmental setup.

It should be pointed out that the inventive method as shown in FIG. 3 or FIG. 4 can be efficiently integrated with the existing advanced Wastewater Treatment Plant after the biological step (the $2^{nd}$ stage of the plant) as shown in FIG. 5 to achieve vital technical, economical and environmental benefits. The first benefit is the substantial reduction in the cost of the inventive method by taking advantage of the relatively low concentrations of scale-prone species from the biological step (Table 4, last column). The second benefit is that the effectiveness of inventive method of removing scale-prone species provides a ZLD method which would: (1) entirely eliminate the need for the existing RO step along with its filtration steps of the original Wastewater Treatment Plant (FIG. 2) since the salinity is within the range of potable water (TDS<500 mg/L); (2) resolve the on-going generation of unwanted RO reject stream and its environmental consequences at the spot; and (3) prevent building a new redundant plant to treat the RO reject stream when the existing Wastewater Treatment Plant can be easily modified in a simple way as a ZLD plant.

It should be pointed out that the inventive methods as shown in FIG. 3 or FIG. 4 can be integrated with thermal-driven or pressure-driven de-salting methods (e.g., Membrane Distillation, Multiple Effect, Mechanical Vapor Recompression, Multi-Stage Flash, RO, Nanofiltration, etc.) in the cases of using very high salinity water sources or the need for de-ionized water as a final product.

It should be pointed out that the inventive methods as shown in FIG. 3 or FIG. 4 can be integrated with ion exchangers to polish, if needed, calcium. In this case, resins of ion exchangers will not be exhausted quickly since water source is sufficiently de-carbonated and de-scaled.

TABLE 1

Steam-Oil Ratio (SOR) for Various Reservoirs Locations.

| Steam Injection Approach | Reservoir Location | SOR |
| --- | --- | --- |
| Steam Flood | California | ~4.0 |
| CSS | Venezuela | ~0.33 |
| CSS | California | 1.0-2.0 |
| CSS | Alberta | 2.0-3.3 |
| SAGD | Alberta | 2.0-3.3 |

TABLE 2

Feed Water Specifications Guidelines for OTSGs and DTBs.

| Parameter (mg/L) | OTSGs A | OTSGs B | DTBs |
| --- | --- | --- | --- |
| TDS: | <10,000 | <20,000 | 100 |
| TH: | <0.5 | <1.0* | ~0.02 |
| Silica: | <50 | <50 | 2 |
| Oil: | <10 | <5 | |
| Iron: | <0.2 | | |
| Oxygen: | <0.05 | <0.007 | |
| pH: | 8.5-10 | 8.5-10 | |
| Sulfate: | | <50 | |
| TSS: | | <0.1 | |

A: SPE-97686-MS-P;
B: Oil Producer in the Gulf Region;
*Magnesium Hardness.

TABLE 3

Samples of Low-Salinity and Relatively High-Salinity Produced Water.

| Species (mg/L) | Low-Salinity | Low-Salinity | High-Salinity |
| --- | --- | --- | --- |
| $Na^+$ | 1,113 | 1,338 | 7,741 |
| $K^+$ | 106 | 121 | 375 |
| $Mg^{+2}$ | 311 | 307 | 595 |
| $Ca^{+2}$ | 1,170 | 1,101 | 2,363 |
| $Sr^{+2}$ | 28 | 32 | 66 |
| $Ba^{+2}$ | 0.02 | 0.03 | 0.1 |
| $Fe^{+2}$ | 0.2 | 0.4 | 0.9 |
| $Cl^-$ | 4,457 | 3,526 | 16,412 |
| $HCO_3^-$ | 1,513 | 1,622 | 247 |
| $SO_4^{-2}$ | 200 | 1,207 | 2,966 |
| $SiO_2$ | 7 | 6 | 13 |
| TDS | 7,388 | 9,260 | 30,267 |
| TH | 4,221 | 4,032 | 8,348 |
| MH | 1,296 | 1,279 | 2,479 |
| pH | 6.8 | 6.7 | 7.5 |

TH: Total Hardness (calcium/magnesium as calcium carbonate)
MH: Magnesium Hardness (as calcium carbonate)

TABLE 4

Samples from an Advanced Wastewater Treatment Plant.

| Species (mg/L) | RO Reject Stream ($4^{th}$ Stage of the Plant) | After Biological Treatment ($2^{nd}$ Stage of the Plant) |
| --- | --- | --- |
| $Na^+$ | 810 | 80 |
| $K^+$ | 79 | 7 |
| $Mg^{+2}$ | 85 | 9 |
| $Ca^{+2}$ | 660 | 43 |
| $Sr^{+2}$ | 6.3 | 0.6 |
| $Ba^{+2}$ | 0.05 | 0.01 |
| $Fe^{+2}$ | 0.3 | 0.01 |
| $Cl^-$ | 1,260 | 105 |
| $HCO_3^-$ | 340 | 71 |
| $SO_4^{-2}$ | 1,280 | 100 |
| $PO_4^{-3}$ | 14 | 2 |
| $SiO_2$ | 5.1 | 0.5 |
| TDS | 4,570 | 418 |
| TH | 2,004 | 145 |
| MH | 354 | 37.5 |
| pH | 7.3 | 7.7 |

TH: Total Hardness (calcium/magnesium as calcium carbonate)
MH: Magnesium Hardness (as calcium carbonate)

What is claimed is:

1. A method for treating source water to produce at least conditioned source water, said method comprising mixing a trivalent cation source with said source water to produce acidified source water, wherein said trivalent cation source comprises converting at least a portion of alkalinity in said source water to carbon dioxide, and feeding said acidified source water to a set of hydrophobic membranes to separate said carbon dioxide, oil, and combinations thereof.

2. The method of claim 1, wherein said source water is selected from the group consisting of domestic wastewater, a reject stream from a domestic wastewater treatment plant, a reverse osmosis reject stream from a domestic wastewater treatment plant, a stream from a biological step of a domestic wastewater treatment plant, industrial wastewater, a reject stream from an industrial wastewater treatment plant, agricultural drainage water, brackish water, a reject stream from a brackish water treatment plant, seawater, a reject stream from a seawater treatment plant, formation water, flue gas desulphurization water, oil-fields produced water, methane-bed produced water, coal-bed produced water, and combinations thereof.

3. The method of claim 1, wherein said trivalent cation source further comprises either aluminum chloride or iron chloride.

4. The method of claim 1, wherein said conditioned source water further comprises separating magnesium and sulfate from said conditioned source water by: (a) mixing a hydroxide source with said conditioned source water to form a precipitate comprising brucite, and either calcium sulfoaluminate or calcium sulfoferrate; (b) filtering said precipitate to produce de-brucited and de-sulfated source water; and (c) stripping said de-brucited and de-sulfated source water by another set of hydrophobic membranes.

5. The method of claim 4, wherein in step (b) said de-brucited and de-sulfated source water further comprises separating calcium from said de-brucited and de-sulfated source water by: (a) reacting said de-brucited and de-sulfated source water with carbon dioxide to form a precipitate comprising calcium carbonate; (b) filtering said precipitate comprising said calcium carbonate to produce de-calcited source water; and (c) stripping said de-calcited source water by said another set of hydrophobic membranes.

6. The method of claim 5, wherein in step (a) said de-brucited and de-sulfated source water is further reacted with a hydroxide source and said carbon dioxide.

7. The method of claim 4 or 6, wherein said hydroxide source is selected from the group consisting of hydrated lime, an amine solvent, and combinations thereof.

8. The method of claim 7, wherein said amine solvent is selected from the group consisting of isopropylamine, propylamine, dipropylamine, diisopropylamine, ethylamine, diethylamine, methylamine, dimethylamine, and combinations thereof.

9. The method of claim 4 or 5, wherein said filtering further comprises a vacuum filter or a filter press.

10. The method of claim 4, wherein said another set of hydrophobic membranes comprises separating oxygen, an amine solvent, and combinations thereof.

* * * * *